United States Patent [19]

Redelberger

[11] Patent Number: 5,801,501
[45] Date of Patent: Sep. 1, 1998

[54] ARRANGEMENT FOR MOVING WINDOW PANES IN A MOTOR VEHICLE

[75] Inventor: Harald Redelberger, Kuernach, Germany

[73] Assignee: Siemens Aktiengesellschaft, Munich, Germany

[21] Appl. No.: 672,696

[22] Filed: Jun. 27, 1996

[30] Foreign Application Priority Data

Jun. 30, 1995 [DE] Germany ............... 295 10 688 U
Sep. 14, 1995 [DE] Germany ............... 295 14 786 U

[51] Int. Cl.$^6$ ........................................... H02P 7/00
[52] U.S. Cl. ............................... 318/283; 318/469
[58] Field of Search .................... 318/280–286, 318/362–370, 466–472; 49/26, 28, 138; 160/291–293

[56] References Cited

U.S. PATENT DOCUMENTS

| | | | |
|---|---|---|---|
| 4,090,113 | 5/1978 | Ogishi | 318/282 |
| 4,563,625 | 1/1986 | Kornbrekke et al. | 318/603 |
| 4,713,591 | 12/1987 | McCloskey | 318/257 |
| 4,998,379 | 3/1991 | Yamada et al. | 49/138 |
| 5,278,480 | 1/1994 | Murray | 318/626 |
| 5,404,673 | 4/1995 | Takeda et al. | |
| 5,436,539 | 7/1995 | Wrenbeck et al. | 318/265 |
| 5,440,944 | 8/1995 | Chen | |
| 5,497,326 | 3/1996 | Berland et al. | 364/424.045 |
| 5,530,329 | 6/1996 | Shigematsu et al. | 318/469 |
| 5,650,698 | 7/1997 | Ito et al. | 318/282 |

FOREIGN PATENT DOCUMENTS

| | | |
|---|---|---|
| 37 38 008 A1 | 8/1971 | Germany . |
| 37 36 400 A1 | 10/1987 | Germany . |
| 4 89 03 714 | 12/1988 | Germany . |
| 40 00 730 A1 | 1/1990 | Germany . |
| 43 18 128 A1 | 6/1993 | Germany . |
| 43 21 264 A1 | 6/1993 | Germany . |
| 43 25 176 A1 | 7/1993 | Germany . |
| 43 39 565 A1 | 11/1993 | Germany . |

*Primary Examiner*—Jonathan Wysocki
*Attorney, Agent, or Firm*—Kenyon & Kenyon

[57] ABSTRACT

An actuator is provided to protect against pinching an object when closing powered automatic windows or sun roofs in motor vehicles in compliance with safety requirements. The displacement speed of the actuator is reduced as a function of the path location of the window or sun roof so that the total force including the stored kinetic energy of the entire drive system in the approach of the window or sun roof panel to an obstacle does not exceed the maximum allowed closing force.

10 Claims, 3 Drawing Sheets

ARRANGEMENT FOR MOVING WINDOW PANES IN A MOTOR VEHICLE

FIELD OF THE INVENTION

The present invention concerns an electric actuator for moving powered windows, partitions, or roof panels in motor vehicles.

BACKGROUND OF THE INVENTION

Actuators of the above-mentioned type are used in motor vehicles, particularly as the drive mechanism for a sun roof or an automatic window opener. The actuators usually include an electric motor, in particular a commutator motor whose extended shaft projects like a worm gear shaft into a gear box mounted on the motor housing where it drives a worm gear that is drivably connected to a mechanism for lifting the window pane or moving the sun roof by means of a catch. Such an actuator is disclosed, for example, in German Utility Model No. 8,903,714.

Stricter requirements have increasingly been made to provide greater protection against pinching an object between a powered automatic window or sun roof and a stationary member. In particular according to U.S. statutory regulation FMVSS118, the closing process must be terminated or the window, partition, or the roof part system must be driven in the opposite direction if it exerts a force of 100 newtons or more on a semirigid cylindrical rod with a diameter of 4 mm to 200 mm that has a certain load-deflection and is inserted as an obstruction at any point through the window, partition or roof part system opening. According to the above-mentioned U.S. regulation, the spring constant or the load-deflection of the test rod shall amount to at least 65 N/mm for a rod with a diameter of 25 mm or less and at least 20 N/mm for a rod with a diameter of more than 25 mm.

It is known from German patent 3,736,400 A1 that when an object becomes pinched in such an opening device, the closing displacement speed can be reduced in the area that is at risk for the purpose of instantaneously reversing or interrupting the drive and then increased again.

OBJECTS AND SUMMARY OF THE INVENTION

One object of the present invention is to provide an actuator that enables fast closing of a power-operated window or similar device on the one hand, while on the other hand assuring that the closing force will be limited in order to conform to official requirements and regulations. This object is achieved by an actuator for moving powered window, partitions, or roof panels in motor vehicles in a path between a first closed position and a second opened position. The path includes a first path range extending from the second opened position toward said first closed position, a last path range extending from the first closed position toward the second opened position, and an intermediate path range between the first and last path ranges. The actuator limits the closing force of the window, partition, or roof panel in the intermediate path range to meet safety requirements in the event an obstruction is encountered. The actuator comprises an electric motor-gear drive unit for moving the window, partition, or roof panel at a displacement speed; and a control device for reducing the displacement speed when the panel is in the intermediate path range as a function of a detected position of the window, partition, or roof panel in the path. As a result, any pressing force applied by the window, partition, or roof panel resulting from stored kinetic energy of the drive unit on any obstruction does not exceed a predetermined maximum allowed closing force. The control device enables an increased displacement speed in the first and last path ranges.

An actuator in accordance with the present invention permits the window pane, partition, or roof panel to be moved at an optimum maximum speed by means of external power in the travel path ranges that are not subject to any safety requirements until just after leaving said ranges. On the other hand, in the path ranges that are subject to a closing force limit, through appropriate adjustment of the speed of the actuator, the driving force of the actuator itself and all the excess energy contained in the moving system do not exceed the maximum allowed pressure load in the sense of a required closing force limit in approaching any obstacle and then reversing to the opposite direction of movement.

For simple and quick speed adjustment, a pulse-width-modulated voltage supply is preferably provided to the drive motor of the actuator to control the required speed of the electric motor and thus the displacement speed of the actuator. For detecting the position of the window, in other words, the path location of the window pane, in a fast and accurate manner, a speed and position sensor whose adjustment depends directly or indirectly on the rotor shaft of the electric motor of the actuator is provided. The speed and position sensor includes a soft magnetic gear wheel on the rotor side that assures high resolution and a permanent magnet on the stator side to create a magnetic field that can be influenced by the gear wheel, as well as a Hall generator, in particular a differential Hall generator, as the sensors to detect fluctuations in the magnetic field that are proportional to speed and possibly also the direction of rotation.

BRIEF DESCRIPTION OF THE DRAWINGS

FIG. 1 shows a door or window frame R of a motor vehicle 100 with a powered window that is operated to the open or half-closed position. An actuator including an electric motor-gear drive unit with a commutator motor M and a downstream worm gear G is provided for the powered raising and lowering movement of window pane S. The commutator motor M is adjusted by a control device ST, especially with regard to its speed setting. To change the speed of the commutator motor M, the control device ST provides pulse width modulation PS for the supply voltage of the electric motor M, as shown in FIG. 2. The position of the window pane S in its path of travel and optionally the direction of travel of the window pane are determined from the rotor position of the commutator motor M on the basis of an initialization position that is detected at first in the end position in opening and in the end position in closing and a downstream incremental rotation sensor for the rotor shaft on the basis of the speed and position sensor SE in the control device ST.

As shown in FIG. 1, a low-speed soft-magnetic gear wheel Z is provided for the speed and position sensor for sensor element SE on the stator side in order to be able to assure high resolution in locating the position and thus assure a rapid speed adjustment of the actuator as a function of the respective path H of the window pane S in its path range between a lower opened end position and an upper closed end position. The gear wheel Z ensures that the magnetic field of a permanent magnet N;S on the stator side is altered in pulses by rotation. At least one Hall sensor HS, in particular a differential Hall sensor is used as the speed and position receiver for such a pulsation. The permanent magnet N;S is preferably fixedly connected to the Hall sensor HS.

According to the requirements of the previously mentioned U.S. safety regulation FMVSS118, the path H between the lower opened end position and the upper closed end position of window pane S encompasses the intermediate ranges H2 and H3 of the path, where a different closing force limit is in effect. In accordance with the regulation, in the first intermediate range H2 of the path of the window, for example, 25 mm to 200 mm before the closed end position, the closing force must be limited to less than 100 newtons, for example, at a spring constant of 20 N/mm for a pinched object caught in the window. According to the same regulation, in the second intermediate path range H3, for example, in the range of 4 mm to 25 mm before reaching the closed end position, the closing force must be limited to 100 newtons at a spring constant of 65 N/mm of the pinched object.

An especially inexpensive embodiment for meeting these safety standards with regard to the closing force limits provides a displacement speed in the sense of a closing force for the entire intermediate path range H2 and H3 that is smaller than the maximum allowed closing force. The actuator can then be shut down or reversed on the basis of a zero-speed detection of the actuator through the control device ST. The adjustment can be individualized to a greater extent with a faster closing operation on the whole at the same time due to the fact that the displacement speed of the actuator is reduced separately in each intermediate path range H2 and H3 in the sense of the maximum closing force limit stipulated in each case.

Figure 1:
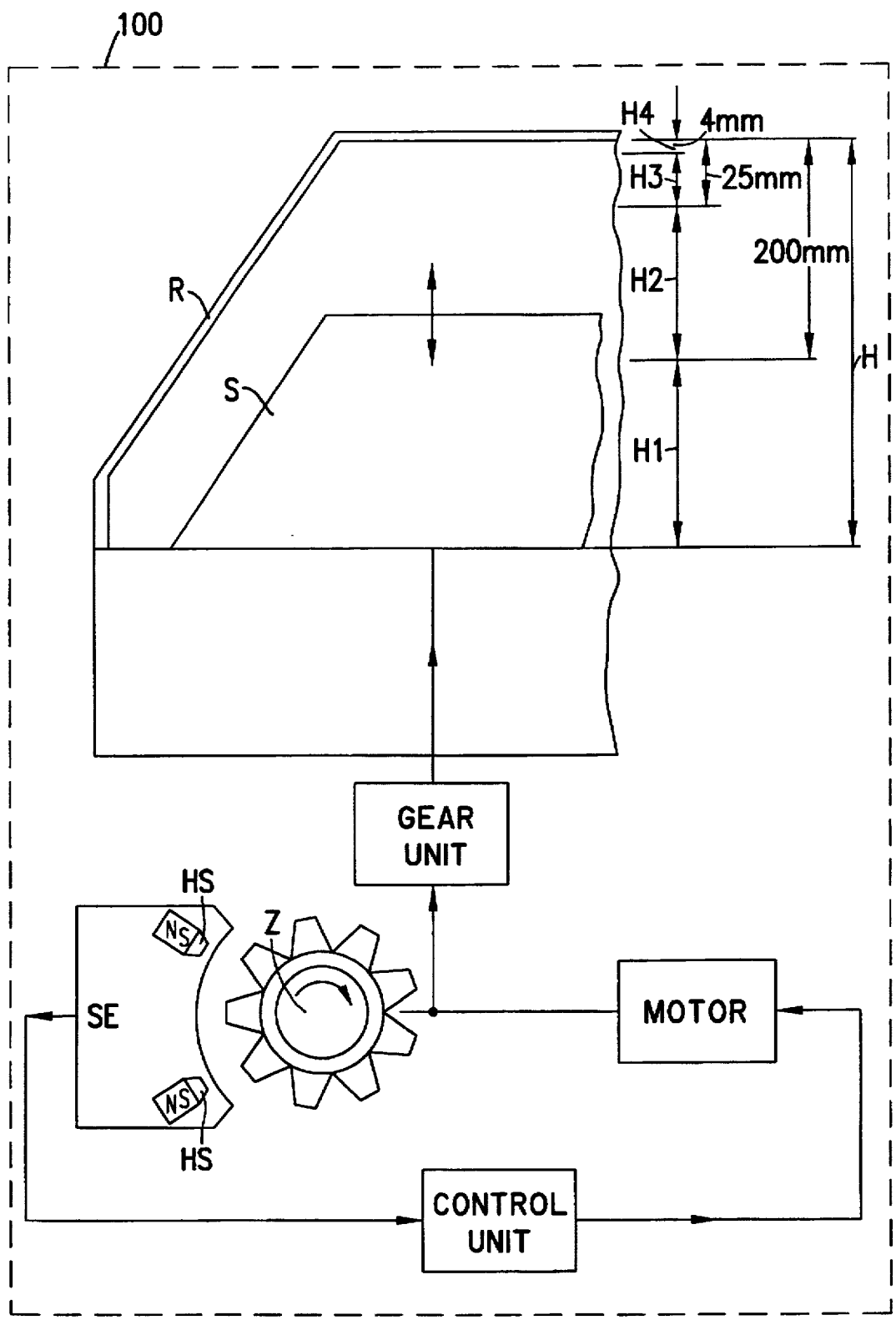
FIG. 1 shows a schematic diagram of an exemplary embodiment of the present invention.
Figure 2:
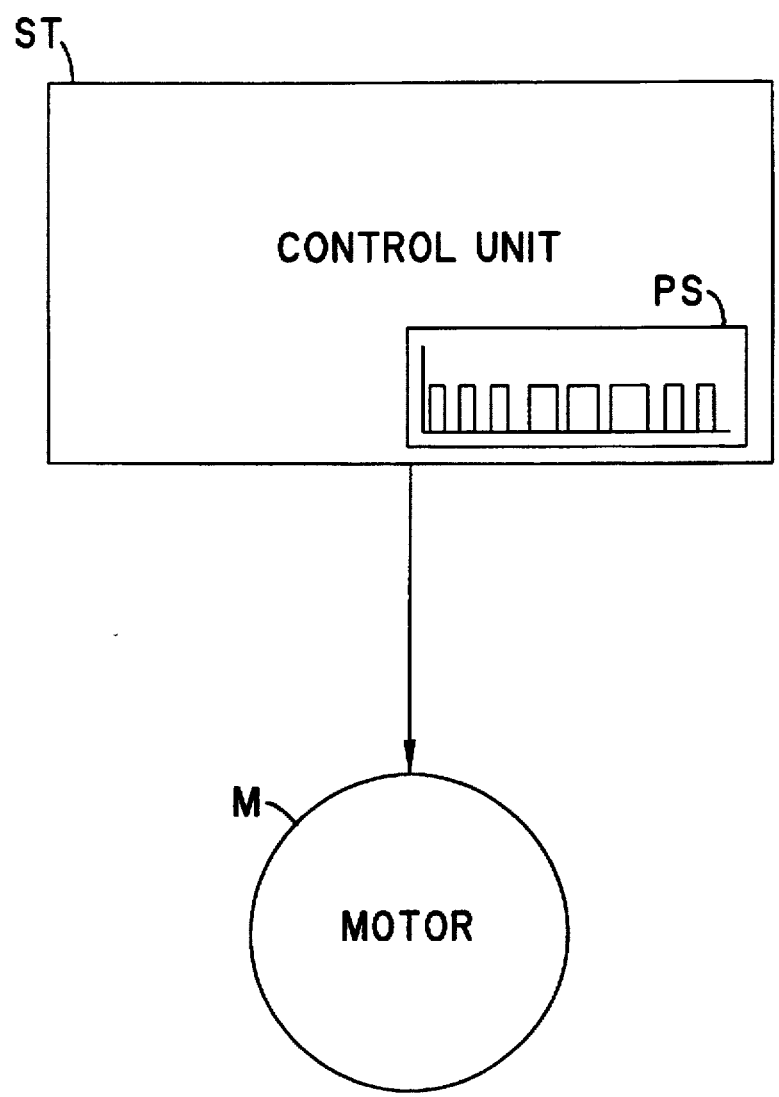
FIG. 2 shows a schematic diagram of an exemplary control unit and an exemplary motor.
Figure 3:
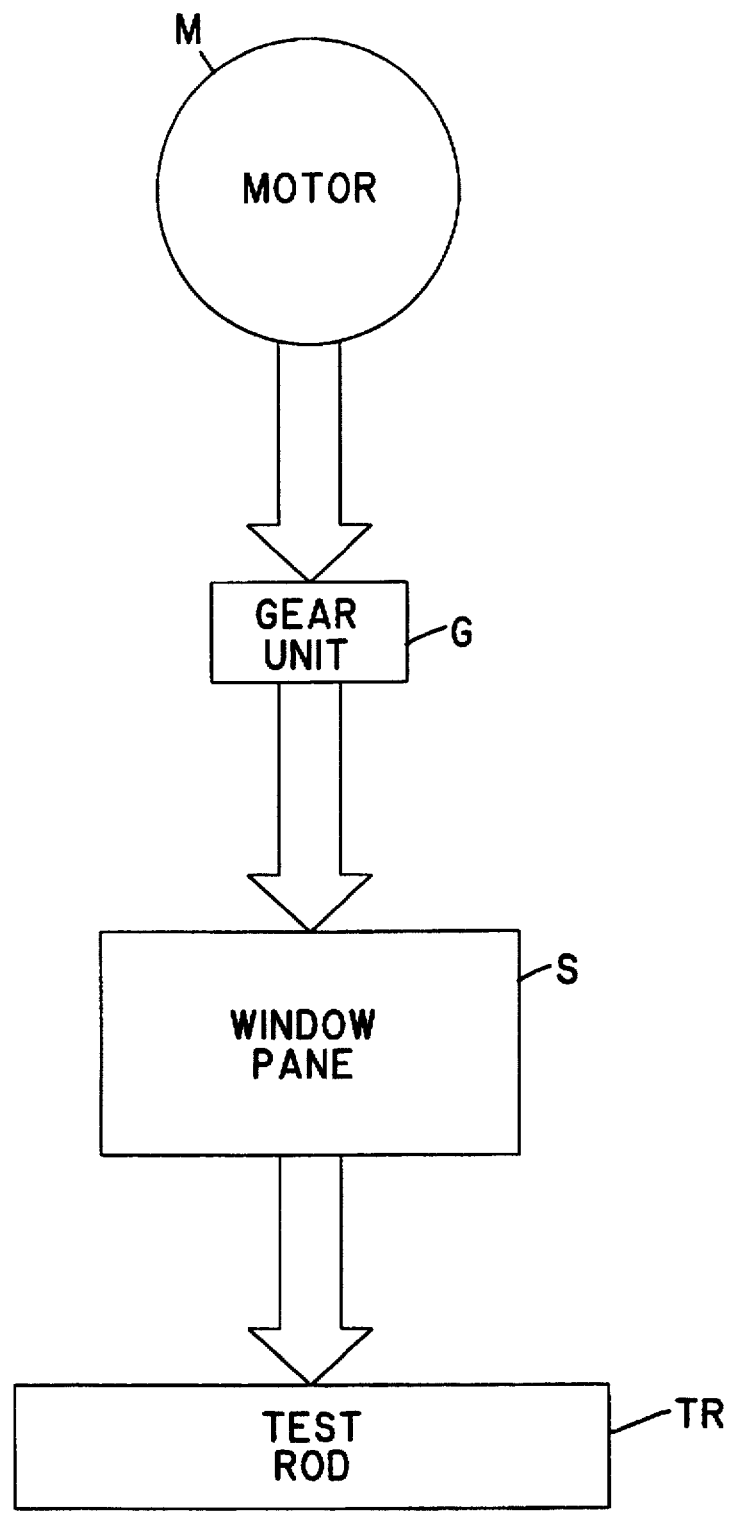
FIG. 3 shows a schematic diagram of the present invention applying a closing force upon a test rod.

In compliance with the aforementioned U.S. standard, the displacement speed of the actuator in the entire intermediate path range H2, H3 is defined in another embodiment of this invention shown in FIG. 3 in the sense of a maximum closing force limit of 100 newtons as the window approaches a stationary obstacle with a spring constant of approximately 65 N/mm, in other words, in accordance with the required closing force limit for the second intermediate path range H3 that is close to the end position in closing. In compliance with the aforementioned U.S. standard, an improved actuator according the embodiment illustrated here that can be adapted even further on an individual basis and in particular with regard to the optimum closing speed is possible. This is due to the fact that the displacement speed of the actuator in the first intermediate path range H2 in the sense of a closing force limit of 100 newtons is reduced as the window approaches a stationary obstacle with a spring constant of approximately 25 N/mm and in the second intermediate path range H3 in the sense of a closing force limit of 100 newtons it is reduced in the approach of the window to a stationary obstacle with a spring constant of approximately 65 N/mm.

Other path ranges Hi and H4 are outside the above-mentioned intermediate path ranges that are subject to a closing force limit. Particularly in the path range H1 immediately after the first opened end position as well as in the path range H4 directly before the second closed end position, the actuator is preferably dependent on the control device for a maximum displacement speed.

Thus, whereas the pulse-width-modulated control device for the motor voltage of the commutator motor M is preferably controlled continuously in the sense of a 100% modulation in the two outer path areas Hi and H4 that are near the end positions, the speed of the rotor shaft of the commutator motor M and thus the displacement speed of the actuator are reduced by appropriate cycling of the pulse-width-modulated motor voltage PS in the intermediate path ranges H2 and H3 that are subject to the closing force limit requirement. Preferably the motor speed is also regulated such that fluctuations in the supply voltage and different frictional conditions and temperature conditions are permitted to achieve a largely constant optimum speed of movement of the window pane.

I claim:

1. An arrangement for moving a window pane in a motor vehicle along a path between a closed position and an opened position, comprising:

an electric motor-gear drive unit driving the window pane along the path using at least three displacement speeds; and a control device connected to the electric motor-gear drive unit for controlling the at least displacement speeds, wherein the path includes a first path range extending from the opened position, a last path range extending from the closed position and an intermediate path range arranged between the first path range and the last path range, the intermediate path range including at least a first intermediate path range and a second intermediate path range, the first intermediate path range being positioned at a first predetermined distance from the closed position, the second intermediate path range being positioned at a second predetermined distance from the closed position, the first predetermined distance being smaller than the second predetermined distance, wherein the window pane is driven at a first displacement speed in the first path range, the window pane being driven at a second displacement speed when the window pane is in the first intermediate path range, the window pane being driven at a third displacement speed when the window pane is in the second intermediate path range, the window pane being driven at a fourth displacement speed in the last path range, wherein the second and third displacement speeds are smaller than the first and fourth displacement speeds and are determined as a function of a detected position of the window pane along the path, and wherein a closing force applied by the window pane on an obstruction does not exceed a predetermined maximum allowable closing force defined by safety standards, the closing force resulting from a driving force of the electric motor-gear drive unit and a stored kinetic energy of the arrangement, and the obstruction being encountered in the first and second intermediate path ranges.

2. The arrangement according to claim 1, wherein the closing force applied in the first intermediate path range is set with respect to a first resistant test rod with a first spring constant, and wherein the closing force in the second intermediate path range is set with respect to a second resistant test rod having a second spring constant greater than the first spring constant.

3. The arrangement according to claim 1, wherein a selected displacement speed of the window pane is reduced from the first displacement speed to the second displacement speed as a function of the predetermined maximum allowable closing force in the intermediate path range.

4. The arrangement according to claim 1, wherein a selected displacement speed of the window pane is reduced from the first displacement speed to the second displacement speed as a function of the predetermined maximum allowable closing force in the first intermediate path range, and wherein a selected displacement speed of the window pane is reduced from the second displacement speed as a function of the predetermined maximum allowed closing force in the second intermediate path range.

5. The arrangement according to claim 1, wherein the first intermediate path range extends from approximately 200 mm from the closed position to approximately 25 mm from the closed position, wherein the second intermediate path range extends from approximately 25 mm from the closed position to approximately 4 mm from the closed position, wherein a selected displacement speed of the window pane is reduced from the first displacement speed to the second displacement speed in the intermediate path range as a function of a predetermined maximum allowable closing force of 100 Newtons applied by the window pane on a resistant test rod having a spring constant of approximately 65 N/mm.

6. The arrangement according to claim 1, wherein the first intermediate path range extends from approximately 200 mm from the closed position to approximately 25 mm from the closed position, wherein the second intermediate path range extends from approximately 25 mm from the closed position to approximately 4 mm from the closed position, wherein a selected displacement speed of the window pane is reduced from the first displacement speed to the second displacement speed in the first intermediate path range as a function of the predetermined maximum allowable closing force of 100 Newtons applied by the window pane on a resistant test rod having a spring constant of approximately 20N/mm, and wherein a selected displacement speed of the window pane is reduced from the second displacement speed to the third displacement speed in the second intermediate path range as a function of the predetermined maximum allowable closing force of 100 Newtons applied by the window pane on a resistant test rod having a spring constant of approximately 65 N/mm.

7. The arrangement according to claim 1, wherein the control device controls a selected displacement speed of the window pane by providing a pulse width modulation of a voltage, the voltage being supplied to the electric motor-gear drive unit.

8. The arrangement according to claim 7, wherein the electric motor-gear drive unit includes a d.c. motor.

9. The arrangement according to claim 1, further comprising:
   a speed/position sensor provided for the rotor shaft of the electric motor, the speed/position sensor detecting the position of the window pane along the path.

10. The arrangement according to claim 9, wherein the speed/position sensor includes at least one soft-magnetic gear wheel on a rotor side of the motor, a permanent magnet on a stator side of the motor and at least one differential Hall sensor.

* * * * *